United States Patent Office 3,255,245
Patented June 7, 1966

3,255,245
PROCESS FOR THE PRODUCTION OF N,N',N''-TRIORGANO-SUBSTITUTED BORAZOLES
Elmar-Manfred Horn, Aachen, and Konrad Lang, Leverkusen, Germany, assignors to Farbenfabriken Bayer Aktiengesellschaft, Leverkusen, Germany, a corporation of Germany
No Drawing. Filed Aug. 23, 1962, Ser. No. 218,866
Claims priority, application Germany, Aug. 24, 1961, F 34,767
6 Claims. (Cl. 260—551)

The present invention relates to an improved process for the production of borazoles carrying organic substituents on the nitrogen atoms.

Substituted borazoles are of technical importance. They may be employed for instance as additives to fuels and lubricants, as starting materials for the production of high molecular weight polymers containing boron, which exhibit neutron absorbing properties. Therefore there is a high demand for an economical process to prepare the aforesaid substituted borazoles.

Accordingly, it is an object of this invention to provide a novel process for the preparation of N,N',N''-triorgano-substituted borazoles. Another object of the present invention is to provide a process for the economical preparation of N,N',N''-triorgano-substituted borazoles from starting materials which can be handled without specific precautions. It is another object of the present invention to provide a process for the production of N,N',N''-triorgano-substituted borazoles without employing the poisonous diborane. Still another object of the present invention is to provide a process of producing the borazoles in high yields and in a high degree of purity.

These and other objects will be described in the following description.

It is known to prepare N,N',N''-triorgano-substituted borazoles of the general formula

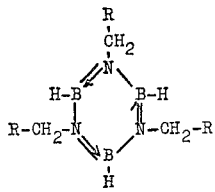

by a process which requires starting materials sensitive to air and moisture, such as lithium aluminum hydride.

There is also known a process which can only be carried out in certain expensive solvents, such as, polyethylene-glycol-dialkyl ethers. Thus, for example, U.S. Patent 2,945,882 describes the reaction of N,N',N''-triphenyl-B,B',B''-trichloroborazole with lithium aluminum hydride which is extremely sensitive to moisture, whilst in accordance with Journ. Am. Chem. Soc. 76, 3303 (1954) the reaction of B,B',B''-trichloroborazole with lithium borohydride proceeds with the formation of 0.5 mole of diborane per mole of lithium borohydride:

(1) $3LiBH_4 + Cl_3B_3N_3H_3 \rightarrow H_3B_3N_3H_3 + 1.5B_2H_6 + 3LiCl$

Diborane is not only intensely poisonous, but it also often ignites in air. In accordance with Journ. Am. Chem. Soc. 82, 89 (1960), the reaction of N,N',N''-trisubstituted B,B',B'' - trichloroborazoles with sodium borohydride in tri- and di-ethylene-glycol dimethyl-ethers also takes place by analogy with Equation 1, i.e. with diborane elimination. According to Journ. Am. Chem. Soc. 77, 864 (1955), N,N',N''-trialkyl-borazoles can be produced in diethyl ether by the reaction of monoalkyl-ammonium halides with lithium borohydride, e.g. in accordance with (2):

(2) $3(RNH_3)Cl + 3LiBH_4 \rightarrow H_3B_3N_3R_3 + 8H_2 + 3LiCl$ but this method not merely requires high temperatures as well as involving the difficulty of manipulating lithium borohydride in addition to ether, but moreover only 25% of the hydrogen present in the borhydride is recovered as N,N',N'' - trialkyl - B,B',B''-trihydrogenoborazole since the remainder escapes as gaseous hydrogen.

The disadvantages of the previous processes for the production of N,N',N'' - triorgano-B,B',B''-trihydrogenoborazoles as described above are overcome to an appreciable extent by the process described in U.S. patent application Serial No. 189,705, which consists in reacting borazanes with primary amines, e.g. in accordance with (3):

(3) $3(C_2H_5)_3N \cdot BH_3 + 3C_6H_5NH_2 \rightarrow 3(C_2H_5)_3N + H_3B_3N_3(C_6H_5)_3 + 6H_2$ with 33.3% utilization of the hydride hydrogen from the borazane. This process can also be carried out by starting directly from metal borohydrides, boron halides, and primary amines and by dispensing with the isolation of the borazane intermediate stage, as formulated in Equation 4, by way of example:

(4) $12RNH_2 + 9NaBH_4 + 12BF_3 \cdot THF \rightarrow$
$4H_3B_3N_3R_3 + 24H_2 + 9NaBF_4 + 12THF$ (THF=tetrahydrofuran); in this case, again, 33.3% of the hydride hydrogen present in the borohydride is utilized for the formation of N,N',N''-triorgano-B,B',B''-trihydrogenoborazoles.

In accordance with the invention it has been found that N,N',N''-triorgano-substituted borazoles of the general formula

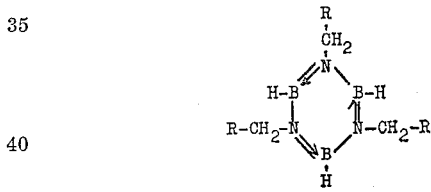

can be produced by reacting a complex metal hydride with carboxylic acid nitriles of the general formula

R—CN and a boron halide or an addition compound of a boron halide with an ether or by reacting a complex metal hydride with an addition compound of a boron halide with carboxylic acid nitriles. The reaction may be carried out at a temperature from about 0° C. to about 100° C.

In the aforesaid formula R represents a member of the group consisting of alkyl radicals, cycloalkyl radicals, aromatic radicals and substituted aromatic radicals. When using acetonitrile, sodium borohydride and boron trifluoride tetrahydrofuran as starting materials, the process according to the invention can be represented by Equation 5:

(5) $12CH_3C\equiv N + 9NaBH_4 + 12BF_3 \cdot THF \rightarrow$
$4H_3B_3N_3(C_2H_5)_3 + 9NaBF_4 + 12THF$ (THF=tetrahydrofuran.) Thus, no diborane is formed during the reaction, and moreover the hydride hydrogen present in the borohydride is quantitatively utilized for the hydrogenation of the employed nitriles and for the formation of the N,N',N''-triorgano - B,B',B'' - trihydrogeno-borazoles.

In the process according to the invention the following starting materials may be used.

I. Carboxylic acid nitriles—

(1) Aliphatic nitriles such as: acetonitrile, propionitrile, butylonitriles and the nitriles of the octane-, dodecane-, and hexa-decane carboxylic acids,
(2) Cycloalkyl nitriles such as: hexahydrobenzoic acid nitrile,
(3) Aromatic nitriles such as: benzoic acid nitrile,
(4a) Substituted aromatic nitriles such as: mono- and polyalkyl substituted benzoic acid nitriles e.g. 3-methyl-benzonitrile and 4,6-dimethyl-benzonitrile,
(4b) Mono- and poly-alkoxy substituted benzonitriles, e.g. 2-methoxy-benzonitrile,
(4c) Mono- and poly-aryl substituted benzonitriles, e.g. 4-phenyl-benzonitrile,
(4d) Mono- and poly-aroxy substituted benzonitriles,
(4e) Mono- and poly-halogen substituted benzonitriles, e.g. 2-chlorobenzonitrile, 3 - bromo - benzonitrile, and 2,4-dichlorobenzonitrile,
(5) Naphthonitriles,
(6) Substituted naphthonitriles such as: α-naphthonitrile and β-naphthonitrile, IIa. Boron halides of the general formula $$BX_3$$

wherein X represents a member of the group consisting of F, Cl, Br, and I.

IIb. Addition compounds of boron halides with ethers such as diethyl ether, dimethyl-ether and tetrahydrofuran, IIc. Addition compounds of boron halides with nitriles as defined in section I, III. Complex metal hydrides selected from the group consisting of alkali metal borohydrides and alkali metal aluminum hydrides.

For reason of economy it is preferred to employ boron trifluoride or its addition compounds.

Also by virtue of economic considerations, it is preferred to use sodium metal borohydrides or sodium metal aluminum hydrides, particularly the cheap sodium borohydride or sodium aluminum hydride which is also readily obtainable; however, other borohydrides or aluminohydrides are also susceptible of reaction.

The use of solvents or suspension agents, e.g. ethers such as tetrahydrofuran, or hydrocarbons, constitutes an advantage, but other solvents or suspension agents inert towards the reaction partners may also be employed.

The present process is preferably carried out at temperatures above 0° C., preferably between +40° C. and +100° C. The lower reaction temperatures permit the process to be performed without the application of pressure; however, it is also possible to operate under pressure, e.g. under nitrogen pressure.

The reaction in accordance with the invention is surprising to the extent that it is known from Journ. Chem. Soc. (London), 1960, 2614, for the adduct obtained at low temperatures from, e.g., propionitrile and diborane, to decompose "violently in a vacuum when warmed rapidly to room temperature, leaving a pale brown amorphous solid" which contains carbon, hydrogen, nitrogen, and boron. N,N',N''-tri-n-propyl-B,B',B''-trihydrogenoborazole is formed only when the propionitrile-borane addition compound prepared at −132° C. is decomposed with care over a period of 5 days.

The process according to the invention represents a technical advance in several respects. The previous processes for the production of N,N',N''-triorgano-B,B',B''-trihydrogeno-borazoles described at the present state of the art, which pass either via the intermediate stage of N,N',N''-triorgano-B,B',B''-trichloro-borazoles or via organic substituted ammonium salts, necessitate expensive solvents, high temperatures, and/or they produce diborane as an undesirable dangerous by-product. On the other hand, the process according to the invention permits the production of the said borazoles in high yields from readily available and cheap starting materials under gentle and easily controlled reaction conditions, whereby a quantitative utilization of the hydride hydrogen employed in the form of borohydride or aluminohydride is achieved for the first time.

The following examples illustrate the invention.

*Example 1*

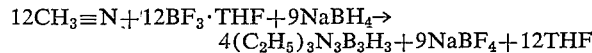

246 g. (=6 moles) of acetonitrile are added in an atmosphere of protective gas to a suspension of 204 g. (=5.4 moles) of sodium borohydride in 2 litres of anhydrous tetrahydrofuran, in a round-bottomed flask provided with a stirrer, reflux condenser, dropping funnel, and immersed thermometer, and 840 g. (=6 moles) of the addition compound of boron trifluoride with tetrahydrofuran are then added dropwise to this reaction mixture, slowly during about 2 hours so that moderate boiling of the contents of the flask under reflux is maintained. Subsequently, it is heated to boiling under reflux for another 2 hours, in order to complete the reaction, it is cooled down, sodium tetrafluoroborate is filtered off, the filter residue is rinsed with tetrahydrofuran, and the tetrahydrofuran is distilled off from the filtrate at normal pressure, N,N',N''-triethyl-B,B',B''-trihydrogenoborazole, identified by its infra-red spectrum, is obtained by fractionation of the residue in vacuo at a yield of 81.5%, in addition to small amounts of polymeric borazoles.

*Example 2*

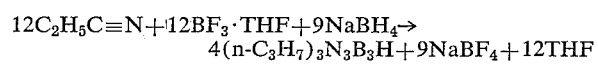

In the apparatus described above, 220 g. (=4 moles) of propionitrile are added in an atmosphere of protective gas to a suspension of 124.8 g. (=3.3 moles) of sodium borohydride in 2 litres of anhydrous tetrahydrofuran, and 560 g. (=4 moles) of the addition compound of boron-trifluoride with tetrahydrofuran are added dropwise to the reaction mixture within about 1.5 hours, so that the temperature of the reaction mixture amounts to about 60–70° C. towards the end of the addition of boron trifluoride-tetrahydrofuran addition compound. After boiling under reflux for two hours, the reaction product is worked up as described in Example 1, and N,N',N''-tri-n-propyl-B,B',B''-trihydrogeno-borazole, identified by its infrared spectrum, is obtained by fractionation in vacuo at a yield of 89.9%, in addition to small amounts of polymeric borazoles.

*Example 3*

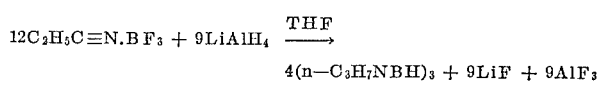

A solution of 246 g. (=2 moles) of the addition compound of propionitrile with boron trifluoride in 144 g. of tetrahydrofuran is added dropwise, under argon as protective gas, to a cooled solution of 63 g. (=1.66 moles) of lithium aluminium hydride in 2.7 litres of absolute tetrahydrofuran in a round-bottomed flask provided with a dropping funnel, immersed thermometer, stirrer, and reflux condenser during about 30 minutes. The reaction mixture is then warmed to boiling under reflux for 2 to 2.5 hours with vigorous stirring. After cooling, the lithium fluoride-aluminum fluoride mixture is separated by centrifuging, the residue after centrifuging is warmed to boiling under reflux with 600 ml. of dry tetrahydrofuran, whilst stirring, and it is centrifuged again. The solvent is distilled off from the combined tetrahydrofuran solutions at normal pressure, and N,N',N''-tri-n-propyl-B,B',B''-trihydrogeno-borazole, identified by its infra-red spectrum, is obtained by fractionation in vacuo at a yield of 80%, in addition to small amounts of polymeric borazoles.

Example 4

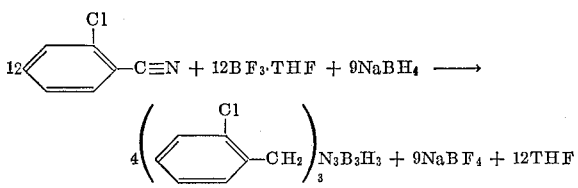

In the apparatus described in Example 1, 550 g. (=4 moles) of o-chloro-benzonitrile are added in an atmosphere of protecting gas to a suspension of 125.5 g. (=3.3 moles) of sodium borohydride in 3.5 l. of anhydrous tetrahydrofuran and 560 g. (=4 moles) of boron-trifluoride with tetrahydrofuran are added dropwise to the addition compound of the mixture with stirring within about two hours so that slight boiling under reflux occurs towards the end of the addition of BF₃·THF. The contents of the flask is then heated to boiling under reflux for about another four hours, and the reaction mixture is worked up as described in the preceding Examples. After recrystallizing from ligroin, N,N',N''-tri-(o-chloro-benzyl)-B,B',B''-trihydrogenborazol, which is obtained in a yield of 86% and is identified by its infra-red spectrum, melts at 103° C. *Analysis.*—Calculated: B, 7.13%. Found B, 7.1%.

In the foregoing description the principle and mode of practicing the invention was described, but within the scope of the appended claims, the invention may be practiced otherwise than as specifically described.

We claim:

1. A process of preparing N,N',N''-triorgano-substituted borazoles of the formula

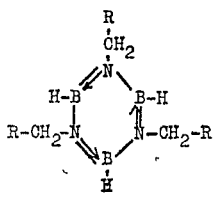

wherein R represents a member selected from the group consisting of alkyl, cycloalkyl, phenyl, naphthyl, and phenyl and naphthyl substituted by from 1 to 3 members of the group consisting of lower alkyl, lower alkoxy, halogen, cyano, phenyl, and hydroxyl, which comprises reacting at a temperature of from about 0 to 100° C.

(A) a member selected from the group consisting of alkali metal borohydrides and alkali metal aluminum hydrides with
(B) a carboxylic acid nitrile of the formula R—CN, wherein R has the meaning given above, and
(C) a compound selected from the group consisting of boron trihalides and addition compounds of boron trihalides with ethers, and recovering the thus produced N,N',N''-triorgano-substituted borazoles.

2. A process of preparing N,N',N''-triorgano-substituted borazoles of the formula

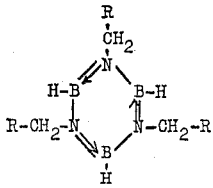

wherein R represents a member selected from the group consisting of alkyl, cycloalkyl, phenyl, naphthyl, and phenyl and naphthyl substituted by from 1 to 3 members of the group consisting of lower alkyl, lower alkoxy, halogen, cyano, phenyl, and hydroxyl, which comprises reacting at a temperature of from about 0 to 100° C.

(A) a member selected from the group consisting of alkali metal borohydrides and alkali metal aluminum hydrides with
(B) an addition compound of a boron halide and a carboxylic acid nitrile of the formula R—CN, wherein R has the meaning given above, and recovering the thus produced N,N',N''-triorgano-substituted borazoles.

3. A process of preparing N,N',N''-triethyl-B,B',B''-trihydrogeno-borazole ((C₂H₅)₃N₃B₃H₃), which comprises reacting at a temperature of from about 0 to 100° C. acetonitrile sodium borohydride and the addition compound of boron trifluoride with tetrahydrofuran in tetrahydrofuran solution and recovering the thus produced N,N',N''-triethyl-B,B',B''-trihydrogeno borazole.

4. A process of preparing N,N',N''-tri-n-propyl-B,B',B''-trihydrogeno borazole ((n-C₃H₇)₃N₃B₃H), which comprises reacting at a temperature of from 0 to 100° C. propionitrile with sodium borohydride and the addition compound of boron-trifluoride with tetrahydrofuran in tetrahydrofuran solution, and recovering the thus produced N,N',N''-tri-n-propyl-B,B',B''-trihydrogeno borazole.

5. A process of preparing N,N',N''-tri-n-propyl-B,B',B''-trihydrogeno borazole ((n-C₃H₇)₃N₃B₃H), which comprises reacting at a temperature of 0 to 100° C. an addition compound of propionitrile with boron-trifluoride with lithium aluminum hydride in the presence of tetrahydrofuran, and recovering the thus produced N,N',N''-tri-n-propyl-B,B',B''-trihydrogeno borazole.

6. A process of preparing N,N',N''-tri-(o-chlorobenzyl)-B,B',B''-trihydrogeno-borazole

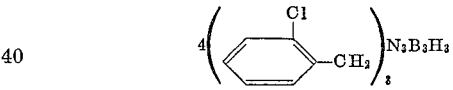

which comprises reacting at a temperature of from 0 to 100° C. o-chloro-benzoic acid nitrile with sodium borohydride and the addition compound of boron-trifluoride with tetrahydrofuran, and recovering the thus produced N,N',N'' - tri - (o - chloro-benzyl)-B,B',B''-trihydrogenoborazole.

References Cited by the Examiner

UNITED STATES PATENTS

| | | | |
|---|---|---|---|
| 2,544,472 | 3/1951 | Schlesinger et al. | 23—204 |
| 2,658,816 | 11/1953 | Boldebuck et al. | 23—204 |
| 2,737,447 | 3/1956 | Elliot | 23—204 |

OTHER REFERENCES

Emeleus et al.: J. Chem. Soc. 1960, part 2, pages 2614–2617.

Gaylord: "Reduction with Complex Metal Hydrides," pages 731 to 732 and 750, Interscience Publishers Inc. (1956), N.Y.

Mikhailov: Russian Chemical Reviews, volume 29, No. 8, pp. 459–460 (1960).

Schechter et al.: "Boron Hydrides and Related Compounds," pages 107 to 110, Callery Chemical Co. (1951).

Shapiro et al.: J. Am. Chem. Soc., vol. 74, pp. 901 to 904 (1952).

WALTER A. MODANCE, *Primary Examiner.*

JOHN D. RANDOLPH, *Examiner.*